United States Patent [19]

Bateson et al.

[11] Patent Number: 4,919,956

[45] Date of Patent: Apr. 24, 1990

[54] METHODS FOR DRYING HONEY AND MOLASSES

[75] Inventors: George F. Bateson, Roseville; Charles A. Morris, Brooklyn Park; Glenn C. Heuer, St. Paul, all of Minn.

[73] Assignee: Ogilvie Mills, Inc., Keokuk, Iowa

[21] Appl. No.: 692,609

[22] Filed: Jan. 17, 1985

[51] Int. Cl.$^5$ ............................................. A23P 1/12
[52] U.S. Cl. ..................................... 426/465; 426/658
[58] Field of Search ............... 426/658, 456, 443, 471, 426/448, 465, 520, 457, 470, 609; 127/9, 29, 46.1, 58, 61

[56] References Cited

U.S. PATENT DOCUMENTS

| | | | |
|---|---|---|---|
| 3,843,821 | 10/1974 | Glabe et al. | 426/658 |
| 3,880,668 | 4/1975 | Miller | 426/658 |
| 3,950,551 | 4/1976 | Glabe | 426/658 |
| 3,985,912 | 10/1976 | Glabe et al. | 426/658 |
| 4,013,482 | 3/1977 | Jaconelli | 426/658 |
| 4,159,210 | 6/1979 | Chen et al. | 127/29 |
| 4,418,088 | 11/1983 | Cantenot | 426/448 |
| 4,472,450 | 9/1984 | Platt et al. | 426/658 |

OTHER PUBLICATIONS

Van Arsdel et al., 1973, Food Dehydration, vol. 1, pp. 140–145 and 150–156, AVI Publishing Co., Inc., Westport, CT.
Mottern et al., Food Technology, 23(4) 169.
Anon., 1960, The Journal of Teflon, vol. 1, No. 4, p. 7.

*Primary Examiner*—Carolyn Paden
*Attorney, Agent, or Firm*—Fisher, Christen & Sabol

[57] ABSTRACT

Substantially pure honey, molasses, or mixtures thereof can be dried using extrusion or thin film drying. An improved cooling technique can be used with the thin film drying method by applying the hot dried molasses and honey to a cold, rotating cylinder, and then collecting the cooled product from the cylinder.

9 Claims, No Drawings

METHODS FOR DRYING HONEY AND MOLASSES

BACKGROUND OF THE INVENTION

Honey and molasses are both viscous sticky sweet fluids widely used as sweetners and in cooking. Molasses is a thick, dark to light brown viscous syrup that is separated from raw sugar in the successive processes of sugar manufacturing. This molasses can be derived from either cane or beet sugars. Typically, molasses are collected as tailings during the separation of sugars from beet and cane sugar sources.

Natural honey is a sweet sticky fluid collected by bees and deposited in a wax honeycomb cell. Typically, honey contains substantial amounts of levulose and dextrose which are invert sugars or monosaccarides. Monosaccharides can be characterized as being partially hyrolized or predigested which renders them readily assimulatable in the digestive system as opposed to the disaccharides and polysaccharides. As a result of its partially hydrolized nature, honey is a vastly superior foot product and nutrient as compared with other natural food sugars. In addition to this, honey has a substantially greater sweetening ability than other natural sugars. The sticky viscous consistency of both liquid honey and molasses is a serious problems which has caused the use of molasses and honey to be limited.

The incorporation of honey or molasses as a baking ingredient is difficult due to their viscous and sticky nature. The addition of either of these materials in liquid form causes unavoidable losses as a result of the viscous sticky material adhering to the containers. This additionally limits the practical applications available, especially in systems having high fat and oil. For example, it is difficult to use non-dried molasses in a candy bar.

Both honey and molasses have a hygroscopic nature. Both of these dried materials therefore rapidly adsorb water from atmospheric moisture. This adsorption of water from the atmosphere rapidly converts dried honey and molasses into sticky masses.

It would be advantageous to provide improved methods for drying and cooling pure honey and pure molasses to produce dried solid products. It would also be advantageous to produce dried honey and/or molasses products which are readily consumable or which may be readily used in baking, as food additives, or feed materials.

U.S. Pat. No. 4,472,450 describes a method for reducing the water content of honey by exposing a thin layer of honey to air that is heated to a temperature in the range of 40° C. to 75° C. This process, however, results in a honey product having an undesirably high moisture content.

There are a variety of processes presently used to form dried products from honey, molasses and other naturally found viscous sugar containing materials such as corn syrup and sorghum. One such process taught in U.S. Pat. No. 3,718,484 describes a process for dehydrating high fructose corn syrup by mixing the syrup with an ungelatinized starch to form a slurry, followed by heating, gelatinization and dehydration. Another such process is described in U.S. Pat. No. 2,693,420 which describes a honey product containing honey and a gelatinized starch. A similar product is described in U.S. Pat. No. 3,879,567 which describes a method of preparing a dried honey product using a gelatinized starch and non-fat dried milk.

Similar products have also been prepared using molasses. One such product is found in U.S. Pat. No. 3,985,912 which describes a solidified product prepared from molasses by a process in which wheat flour is incorporated with the molasses to form a slurry which is then dehydrated as a thin film on a heated surface.

One method for the preparation of a dry solid molasses product can be found in U.S. Pat. No. 3,698,911. This process is distinct from the previously named patents in that starch is not required in order to prepare the dried molasses product. In this patent, a dry solid molasses is prepared by adjusting the pH of liquid with an alkaline agent followed by drying.

Another process for forming composite food articles out of sugary syrups such as corn syrup, malt syrup, honey, molasses and sorghum can be found described in U.S. Pat. No. 3,950,551. According to this process, ungelatinized starch and/or soy protein can be mixed with the syrup to form a slurry which is then subjected in a thin film to a heated surface in order to form a thin dehydrated film which is then formed into dried or ground flakes. These dried or ground flakes are then mixed with a sufficient amount of water to form an extrudable mixture which is then extruded.

A solidified product from molasses which also contains soy protein is taught in U.S. Pat. No. 3,843,821. This process calls for dehydrating a slurry of molasses and soy protein flour by subjecting the slurry in a thin film to a heated surface.

A solid dry molasses product containing no starch and no protein additives can be prepared in accordance with the process described in U.S. Pat. No. 4,013,482. This patent describes an improved process wherein solid dried molasses is prepared by a process comprising drying and cooling and dividing the dried molasses, the improvement comprising cooling the molasses in a thin layer immediately after the drying step; the layer being sufficiently thin in relation to the cooling temperature in order to allow the molasses to be cooled to the core. The cooled molasses is then precrushed to coarse particles and reduced from the coarse particles to a powder by impact without crushing or significant friction. In this subdivided form, however, the molasses can readily adsorb more moisture, and, due to its hygroscopic nature, will thereby become sticky.

It is accordingly an object of the instant invention to provide an improved method for dried honey and/or molasses wherein the dried, hot honey and/or molasses are cooled on a cold roller thus providing a faster and drier cooling method. A further object of this invention is to provide methods for drying substantially pure honey or molasses. An additional object of the instant invention is to provide for the extrusion drying of substantially pure honey or molasses. Other objects and advantages of the instant invention will become apparent from the following description.

BRIEF DESCRIPTION

Fluids selected from the group consisting of honey and molasses can be dried by a process comprising:
(a) applying the fluid to a surface heated to a temperature in excess of 75° C. in a thin film whereby the fluid becomes heated and moisture is removed, and then,
(b) removing the dried heated fluid from the heated surface, and (c) cooling the dried heated fluid to form a dried product, and (d) collecting the product.

After the fluid has been dried, while it is still hot and is being cooled, it should be maintained in an atmosphere of reduced moisture. Preferably lower pressures are used in addition to heat. This advantageously achieves better drying at lower temperatures.

A further improvement can be obtained in the cooling process wherein the dried heated honey and/or molasses is applied to a cold rotating cylinder in order to cool the honey and/or molasses to a solid dry product. This improvement allows fast cooling, and reduced readsorbtion of moisture. This improved cooling method can be advantageously used to cool hot, dried honey and/or molasses, which was heated and dried using a heated surface. This cooling method can also be used when starch is added to the honey and molasses.

Dried honey, molasses and mixtures thereof, can also be prepared by extrusion drying. Such a process achieves dried honey and molasses in a form which contains very little moisture and which has a low surface area.

Additional dried honey and dried molasses products can be made by mixing honey and/or molasses with starch. The honey and/or molasses and starch mixture is then extrusion dried whereby the starch is gelatinized. This achieves a low surface area, dried honey and/or dried molasses product which is low in moisture and surface area.

DETAILED DESCRIPTION

It has now been discovered that dried honey and dried molasses can be prepared without starch and without other additives using thin film drying of the honey and molasses. In this application, honey and/or molasses is applied to a surface heated to a temperature in excess of 75° C. in a thin film. The water driven away from the honey and/or molasses is thereby removed until the heated honey and/or molasses has attained the desired degree of dryness. While the dried material is still warm and easily flowing, it is removed from the heated surface and cooled. It is important to cool the dried, hot molasses and/or honey rapidly in an atmosphere having reduced moisture and preferably in a substantially moisture free atmosphere. This will reduce readsorption of moisture.

Using thin film drying with reduced pressures to dehydrate pure molasses and honey allows better drying at the lower temperatures, particularly at temperatures less than about 150° C. Since high temperatures are avoided, there is less caramelization and destruction of sugars during the drying process. Higher temperatures and ambient pressures can, however, be used. In such a case, caramelization and destruction of sugars is avoided by rapidly removing the hot, dehydrated fluid from the hot surface. Thin film drying of substantially pure honey and molasses, or mixtures thereof, can thus be done at temperatures in excess of 75° C. and up to about 250° C. When using a thin film evaporation, the temperature is in excess of 75° C., but less than about 225° C. Most preferably, the temperature is in the range of from about 80° to about 200° C. Acceptably pressures can be used from atmospheric down to 0.5 mm of Hg. It is, however, preferred to maintain the pressures in the range of from about 20 mm to about 0.5 mm of Hg in order to achieve dryness with lower temperatures (especially when the temperature is in excess of 75° C. but lower than about 150° C.)

Film thickness will also affect the capability of achieving substantial dryness and obtaining a suitable dried molasses and/or honey product. An acceptable film thickness of the material to be dried therefore is from about 1 mm to about 0.1 mm. It is permissible to use the thin film drying technique with means such as thin film evaporators, or drum drying apparatus.

In cooling, it is preferred and even advisable to cool the heated dehydrated molasses and/or honey by applying the dried hot material to the outer surface of a cooled rotating cylinder. This avoids air cooling which adds moisture to the product as it cools. This also insures a more rapid cooling. Acceptably, the cylinder can be cooled from the inside with water or refrigeration. In using a cold cylinder to cool the hot dried honey, molasses, or mixtures thereof, an atmosphere of reduced moisture should be used. Acceptably when using the rotating cold-cylinder cooling technique, moisture reduced atmosphere is used; and it is preferably used where the atmosphere is substantially moisture free.

This rotating cold cylinder cooling technique can also be used to cool compositions of both honey and molasses with starch. Advantageously, using a cold rotating cylinder will enable such mixture to be cooled more rapidly with less moisture readsorption.

Drum drying is used by applying a thin film of the honey or molasses to the outer surface of a rotating heated drum. The honey or molasses to be dried can be applied by means such as applicator rolls or by dipping the drum into a pan containing the honey or molasses. The drum rotational speed and temperature are selected so that a sufficient drying will occur before one complete revolution. After the material has dried sufficiently, it is removed from the drum before another revolution begins.

The drum rotational speed and the temperature selected will, to a great extent, depend upon the amount of moisture desired in the dried product. Acceptably, the drum rotational speed can be from about 0.5 to about 12 revolutions per minute (rpm). Preferred speeds can be selected from the range of from about 1 to about 5 rpm. Acceptably the drum temperature, (temperature of the drum surface) can range from temperatures in excess of 75° C., preferably from about 80° C. up to about 250° C. and most preferably from about 100° C. to about 200° C. A high number of revolutions per minute (rpm) can be used for the higher temperatures in order to avoid heat damage.

Film thickness can also be limited in order to achieve more efficient drying. As previously indicated, for thin film evaporation, an acceptable film thickness is from about 1 cm to about 0.1 mm, when using either a single or double drum drier.

When using the cold rotating cylinder to cool the dried heated molasses and honey, the temperature of the cold roller is acceptably maintained in the range of from about 0° C. to about 25° C. A preferred temperature is from about 5° C. to about 15° C.

The dried, cooled honey and molasses product is easily removed from the cold, rotating cylinder, and it can, in fact, even fall off. In a preferred application, however, means for removing the dried, cooled product is used to insure a clean removal. A preferred means for such a removal is doctor knives. In another preferred embodiment, the outer surface of the cold, rotating cylinder is coated with a suitable friction reducing polymer to facilitate the removal of the cooled, dried product from the cylinder.

Solid shaped dried molasses and honey compositions can be achieved using extrusion drying. This drying procedure can, surprisingly, be used with pure honey, pure molasses or mixtures thereof. When this type of extrusion drying procedure is used, the dried cooled solid product can advantageously have a low surface area and high volume ratio thereby taking up moisture less rapidly. Extrusion drying can be used for drying substantially pure honey or molasses, or mixtures thereof which also contain starch.

Heated extrusion drying is done by continuously feeding the fluid to be dried into an inlet of an extruder fitted with a heated barrel and continuously collecting the dried material as it exits the extruder. The extruder can be a single or multiple screw extruder fitted with a barrel that can be heated to maintain the selected barrel temperature. The heated barrel of an extrusion drier heats the contents of the extruder to volatilize water contained in the material to be dried. The extruder barrel can be vented to allow the escape of water vapor. The extruder outlet can also be fitted with a die face cutter to cut the extrudate into desired lengths.

When honey or molasses is being dried using an extruder, this extruder can, if desired, contain suitable means for cooling the hot material before discharge. Typically, however, the hot extrudate cools sufficiently after exiting the extruder.

Substantially pure honey, molasses, and mixtures thereof, and honey, molasses and mixtures which also contain starch can be extrusion dried using single or multiple screw extruders. Advantageously, when honey and/or molasses is used with starch, gelatinization can take place during the drying process due to the available moisture combined with the heat and pressure present in an extrusion drying system. Thus an alternate embodiment of the instant invention is to dry honey and/or molasses in a mixture with starch using an extrusion drier. A previously mixed composition of honey and starch or molasses and starch, or a mixture of honey and molasses with starch, can be fed into an extrusion drier and dried at a sufficient temperature to cause gelatinization of the starch. The dried gelatinized starch honey and/or molasses mixture is then cooled.

When drying honey, molasses and mixtures thereof, with or without starch, the temperature of an extrusion drier can acceptably be set within the range of from about 75° C. to 250° C., and preferably set at a temperature range of from about 100° C. to about 220° C. Multiple heating zones, venting zones, compression and reduced pressure venting zones can be used in various combinations to achieve the desired product.

Representative but nonexhaustive examples of starches which can be used with the instant invention to mix with honey and/or molasses for extrusion drying include: Starch and starch products derived from corn, rice, tapioca, maize, wheat, sago, potato, and soybean. When combining starch and molasses or honey, an acceptable range of starch is from about 5 to about 50% by weight. A preferred range for the amount of starch is from about 5 to about 30% by weight of the total wet mixture.

Representative but nonexhaustive examples of other ingredients which can be added to the starch, honey, and molasses to produce a solid dried food product are: corn syrup, preferably in an amount up to about 15% by wt.; hydroxylated lecithin up to about 3% by wt.; soy flour up to about 15% by wt.; and high fructose corn syrup in an amount up to about 33% by wt. In a preferred embodiment, water can also be added to such mixtures in an amount up to about 20% by wt. Flavorings, such as maple and banana can also be added in a sufficient amount.

These and other readily attainable variations of the instant invention will be more fully understood from the examples which follow. These examples are intended to clarify and demonstrate the instant invention and not limit it. All parts and percentages are by weight unless otherwise specified.

EXAMPLES

Example 1

Part A

A six inch double drum drier was used to dry pure honey at the drier conditions indicated below:

| DRIER CONDITIONS | | |
|---|---|---|
| Drum Steam Pressure | Nip Gap | Drum RPM |
| 70 psi (157° C.) | 0.01 inch | 3.5 |

The molten, dried honey was collected as it came off the drum. The dried honey was allowed to cool to a solid mass and then ground to a fine powder in a hammer mill.

The honey was analyzed before and after drying for moisture content. The feed material contained 18% by weight water, and the dried honey contained approximately 2% by weight water.

Part B

A cold rotating cylinder having ice and water inside it could be used to cool the molten, dried honey described in part A by: applying the said molten, dried honey to the cool cylinder as it rotates at about the same speed as the drum drier (here 3.5 rpm). After cooling, the cooled, dried honey is removed from the cylinder with doctor knives. It can then be suitably powdered.

The cylinder's surface can be maintained at about 0° C. by keeping it filled with ice and water.

Example 2

Part A

A six inch double drum drier was used to dry pure molasses at the drier conditions indicated below:

| DRIER CONDITIONS | | |
|---|---|---|
| Drum Steam Pressure | Nip Gap | Drum RPM |
| 72 psi (159° C.) | 0.01 inch | 3.5 |

The molten, dried molasses was collected as it came off the drum. The dried molasses was cooled to a solid mass and then ground to a fine powder in a hammer mill.

The molasses was analyzed for moisture content before and after drying. The feed material contained 18% by weight water, and the dried molasses contained 2.6% by weight water.

Part B

A cooled rotating cylinder having ice and water inside could be used to cool the molten, dried molasses of part A by: applying the said molten, dried molasses to the cool cylinder as it rotates at about the same speed as the drum drier (here 3.5 rpm). After cooling, the cooled, dried molasses is removed from the cylinder with doctor knives. It can then be suitably powdered.

The cylinder's surface can be maintained at about 0° C. by keeping it filled with ice and water.

EXAMPLE 3

Pure molasses was extrusion dried. The molasses initially contained 22.8% by weight moisture.

The extruder used was a one inch single screw Killion extruder (length/diameter ratio=24). The compression ratio was approximately 4:1. The extruder had three temperature zones of feed, middle, and end, and water cooling was used at the feed port. No die was used. The revolutions per minute of the screw was set at 75 rpm. The drying conditions were: Feed zone set at 270° Fahrenheit (F); middle zone set at 330° F.; and end zone set at 330° F.

The dried product was analyzed for moisture and was found to have approximately 2.7% by weight moisture.

Example 4

Pure honey was extrusion dried. The honey initially contained 17.0% by weight moisture.

The extruder used was a one inch single screw Killion extruder (length/diameter ratio=24). The compression ratio was approximately 4:1. The extruder had three temperature zones of feed, middle, and end, and water cooling was used at the feed port. There was no die used. The revolutions per minute of the screw was set at 75 rpm. The drying conditions were: Feed zone set at 280° Fahrenheit (F); middle zone at 340° F.; and end zone at 340° F.

The dried product was analyzed for moisture and was found to have approximately 1.5% by weight moisture.

Example 5

Pure molasses was dried using a six inch wiped film evaporator. The evaporator conditions was set at:

| Wall temperature | 129° C. |
| --- | --- |
| Condenser Temperature | 13° C. |
| Heating Oil Set Temperature | 350° F. |

The vent fan was used to give a pressure slightly below atmospheric, and steam tracing was used on the residue line and pump. The moisture of the molasses feed was analyzed to be 24.04% by weight; the dried molasses product was analyzed to have 3.7% by weight moisture.

Example 6

Pure honey was dried using a six inch wiped film evaporator. The evaporator conditions was set at:

| Wall Temperature | 133°–141° C. |
| --- | --- |
| Condenser Temperature. | 13° C. |
| Heating Oil Set Temperature | 390° F. |

The vent fan was used to give a pressure slightly below atmospheric, and steam tracing was used on the residue line and pump. The moisture of the honey feed was analyzed to be 17.86% by weight; the dried honey product was analyzed to have 1.2% by weight moisture.

Example 7

A blend of 30.4% honey, 29.9% high fructose corn syrup, 27.6% wheat starch, 9.2% corn syrup, 2.3% soy flour, and 0.5% hydroxylated lecithin was dried on a 1 meter single roll drum drier and cooled on an ice water filled cold cylinder. The drum drier operating conditions were those listed in the table below:

| DRIER CONDITIONS | | | | |
| --- | --- | --- | --- | --- |
| Drum Pressure | Drum Speed | Drum Gap | Feed Rate | Applicator Roll Inlet Temperature |
| 108 psig (173° C.) | 3.56 rpm | 0.032 in. | 213 lbs/hr | 72° F. (22.2° C.) |

As the sheet of dried hot honey came off the drum drier, it was applied to the cold cylinder. The cold cylinder was maintained at approximately 0° C. The speed of the cold roller was adjusted so that the honey sheet was pulled from the drum drier onto the cold cylinder. The cooled, dry honey did not stick, and was readily removed from the cold cylinder.

The honey blend was analyzed for moisture content before and after drying. The feed material contained 18.3% by weight water, and the dried material contained 4.4% by weight water.

Example 8

A honey blend with the composition indicated below was dried in a one inch single screw extruder.

| Honey Blend Composition | |
| --- | --- |
| honey | 30.4% |
| high fructose corn syrup | 29.9% |
| wheat starch | 27.6% |
| corn syrup | 9.2% |
| soy flour | 2.3% |
| hydroxylated lecithin | 0.5% |

The extruder was a one inch single screw Killion extruder (length/diameter ratio=24). The compression ratio was approximately 4:1. The extruder had three temperature zones of feed, middle, and end. The range of operating conditions used to dry the honey blend are given below:

| | Extruder Running Conditions |
| --- | --- |
| Zone | Temperature Range |
| 1. (Feed) | (132° C.–182° C.) 270° F.–360° F. |
| 2. (Middle) | (165.5° C.–193° C.) 330° F.–380° F. |
| 3. (End) | (165.5° C.–193° C.) 330° F.–380° F. |

The extruder was operated without a die. The screw turned at 76 revolutions per minute. The extruded honey blend cooled sufficiently as moisture flashed off at the extruder exit. The extruder blend formed a stable and free flowing chipped product.

Example 9

The molasses blend having the composition indicated below was extrusion dried in a one inch single screw Killion extruder (length/diameter ratio of 24):

| | |
|---|---|
| Molasses | 57.7% |
| Wheat Starch | 36.7% |
| Water | 3.0% |
| Soy Flour | 0.9% |
| Hydroxylated Lecithin | 0.9% |

The moisture content of this slurry was about 18.8% by wt. The extruder had three temperature zones of feed, middle and end. The range of operating conditions used to dry the molasses blend is indicated below:

| Feed Port Cooled With Tap Water | |
|---|---|
| Heating Zone 1 | 270°–280° F. |
| Heating Zone 2 | 330°–340°–F. |
| Heating Zone 3 | 330°–340° F. |
| RPM | 75–100 |

The material processed using the single screw extruder exited the barrel as a soft steamy paste. It formed a hard "rocky round chunk" when it had cooled. The dried product had a moisture content of about 2.7% by wt.

Example 10

A molasses blend having the composition indicated below was extrusion dried in a one inch single screw Killion extruder (length/diameter ratio of 24):

| | |
|---|---|
| Molasses | 63.5% |
| Water | 15.3% |
| Soy Flour | 10.5% |
| Wheat Starch | 7.8% |
| Soybean Oil | 1.3% |
| Hydroxylated Lecithin | 0.5% |

The slurry was dried from 31.3 to 3.7% by wt. The slurry was fed to the feed port that had cooling water running trough it. The extruder conditions were as follows:

| Feed Port Cooled With Tap Water | |
|---|---|
| Heating Zone 1 | 260°–280° F. |
| Heating Zone 2 | 320°–340° F. |
| Heating Zone 3 | 320°–340° F. |
| RPM | 75–100 |

Material coming out of the end of the extruder was a soft paste material. When it had cooled, it formed a hard, rocky, round chunk.

What is claimed is:

1. A method for drying a liquid selected from the group consisting of liquid honey and liquid molasses, and liquid mixtures of at least one of liquid honey and liquid molasses with any one or more of a starch carrier, corn syrup in an amount of from up to 15% by weight of the total liquid mixture; hydroxylated lectithin up to about 3% by weight of the total liquid mixture; soya flour in an amount of up to about 15% by weight of the total liquid mixture; high fructose corn syrup in an amount up to about 33% by weight of the total liquid mixture; water in an amount of up to 20% by weight of the total liquid mixture, the method comprising extruding the liquid, without any substantial predrying thereof, in an extrusion dryer at a sufficient temperature to remove moisture from the liquid to yield a cooled, dried, low moisture product, and collecting the low moisture product.

2. A method as claimed in claim 1 wherein the temperature is in the range of from about 75° to about 250° C.

3. A method as claimed in claim 1 wherein the extruder contains a reduced pressure venting zone.

4. A method as described in claim 1 wherein said liquid contains starch in an amount of from about 10 to about 50% by wt of the non-starch ingredients of said liquid.

5. A method as claimed in claim 1 wherein the temperature is in the range of from about 100° to about 220° C.

6. A method as claimed in claim 1 wherein said liquid includes a starch carrier.

7. A method as claimed in claim 6 wherein said carrier starch is selected from one of the groups consisting of corn, rice, tapioca, maize, wheat, sago, potato and soya bean starches.

8. A method as claimed in claim 6 wherein said starch is present in an amount of from about 5% to about 50% by weight of the total liquid mixture.

9. A method as claimed in claim 6 wherein said starch is present in an amount of from about 5% to about 30% by weight of the total liquid mixture.

* * * * *